United States Patent [19]

Schopfer et al.

BEST AVAILABLE COPY

[11] E Re. 29,068

[45] Reissued Dec. 7, 1976

[54] APPLIANCE REMOVAL ALARM SYSTEM FOR MOTELS

[75] Inventors: Walter S. Schopfer, Harrison, N.Y.; Dieter Wuerth, West Boyleston, Mass.

[73] Assignee: WLW Corporation, Danville, Va.

[22] Filed: Sept. 18, 1974

[21] Appl. No.: 507,077

Related U.S. Patent Documents

Reissue of:

[64] Patent No.: 3,766,540
Issued: Oct. 16, 1973
Appl. No.: 139,049
Filed: Apr. 30, 1971

[52] U.S. Cl. ..... 340/280; 340/171 A; 340/223; 340/908; 343/6.5 R

[51] Int. Cl.[2] ..... G08B 25/00; H04Q 9/00

[58] Field of Search ..... 340/280, 276, 191, 216, 340/310 R, 408, 152 T, 412, 413, 223, 415, 171 A; 343/6.8 R, 6.5 R, 6.5 SS; 310/8.1, 8.2; 325/31

[56] References Cited

UNITED STATES PATENTS

| | | | |
|---|---|---|---|
| 3,022,493 | 2/1962 | Tschumi et al. | 343/225 X |
| 3,092,829 | 6/1963 | Kleist | 325/8 UX |
| 3,117,277 | 1/1964 | DeMagondeaux | 343/6.8 |
| 3,145,380 | 8/1964 | Currie | 343/6.5 SS |
| 3,171,108 | 2/1965 | MacKeen | 340/226 |
| 3,253,588 | 5/1966 | Voilleumier et al. | 343/6.5 X |
| 3,432,851 | 3/1969 | Cox, Jr. et al. | 343/6.5 |
| 3,432,852 | 3/1969 | Arnold | 343/6.5 |
| 3,482,243 | 12/1969 | Buchsbaum | 340/280 X |
| 3,508,260 | 4/1970 | Stein | 340/408 X |
| 3,550,090 | 12/1970 | Baker et al. | 340/408 X |

*Primary Examiner*—Glen R. Swann, III
*Attorney, Agent, or Firm*—Fisher, Christen & Sabol

[57] ABSTRACT

A system for the prevention of the theft of televisions sets and other appliances from motels and the like requires the modification of the appliance by connecting a quartz crystal resonator across its terminals. A frequency-modulated oscillator connected to a transmission line linking all of the appliances is employed to stimulate the crystals in sequence. A transmit-receive switch operating at 100 herz frequency and phase detection between the oscillator and the echoes from the crystals improve selectivity, while a counter keeps track of the crystals heard from. An alarm and a visual display of a number indicate the time and place of a theft.

24 Claims, 4 Drawing Figures

APPLIANCE REMOVAL ALARM SYSTEM FOR MOTELS

Matter enclosed in heavy brackets[ ] appears in the original patent but forms no part of this reissue specification; matter printed in italics indicates the additions made by reissue.

This invention relates to theft detection devices and more particularly to apparatus for the detection of the removal of a television set or other electrical appliance from a remote location where it is installed.

In the preferred embodiment of the invention each of the television receivers in a motel is connected to a common antenna system to which is also connected detection equipment so that upon removal of any set, an alarm is sounded and the room number of the removal is displayed at a central monitoring location.

It is an object of the invention that no substantial changes need be made in either the television receiver or in the wiring of a motel to install a system. It is a further objective that the mode of operation of the detection system should not be readily observable or readily disabled by a thief. It is a further objective that the system be fail-safe and reliable.

A feature of the invention by which the above objects are realized is the installation of a simple quartz crystal resonator of predetermined frequency across the input terminals of each set, the frequencies of successive crystals differing in convenient steps of 1000 herz or so.

A further feature of the invention is a voltage controlled oscillator and saw-tooth modulator by which the oscillator frequency is swept from one crystal frequency to the next to check on each set every minute or less.

A still further feature of the invention is a transmit-receive switch by which transmission from the oscillator is interrupted periodically so that the monitoring apparatus may listen for the ringing of the crystals; and it is a feature of the invention that the failure of the apparatus to hear a return echo at the predetermined time corresponding to the frequency of a particular resonator, generates an alarm and a display of the missing response.

Figure 1:
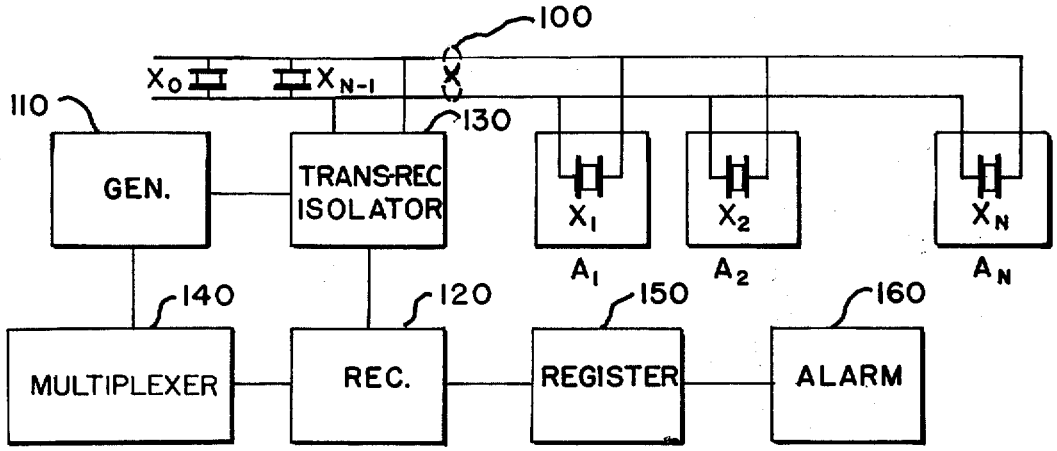
Figure 3:
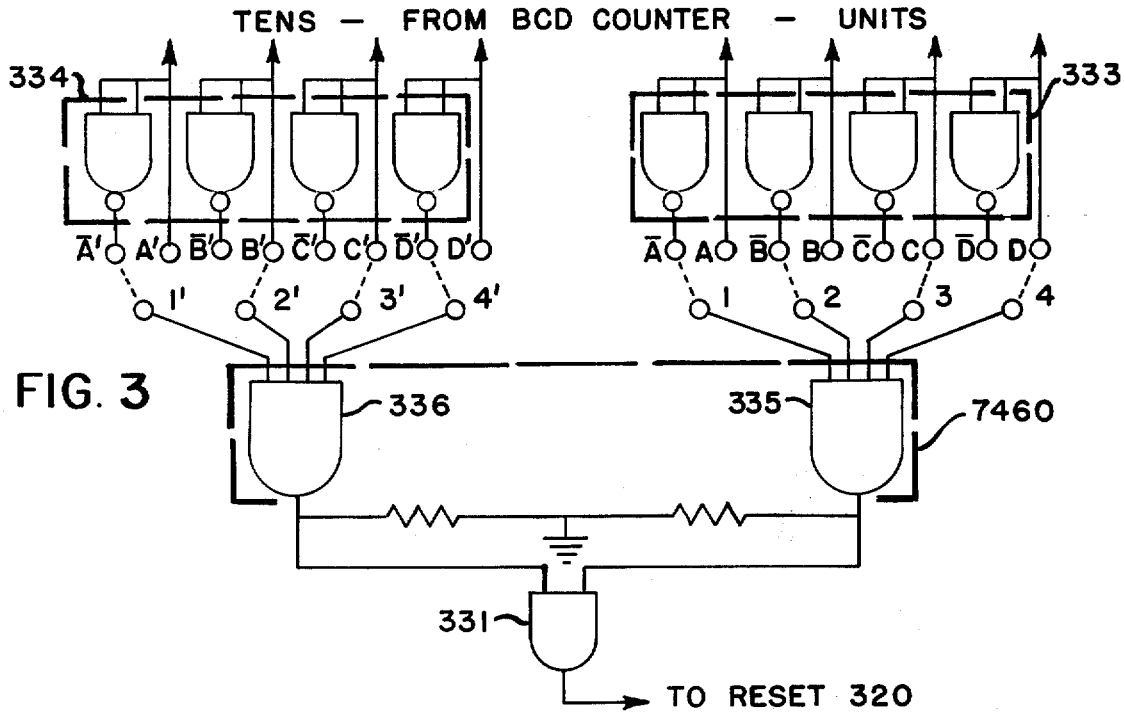
Figure 4:
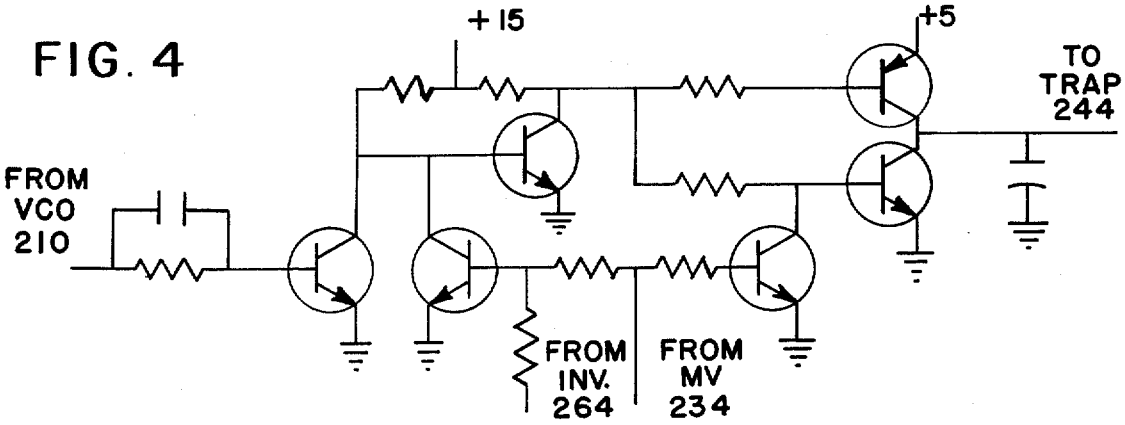
Figure 2:
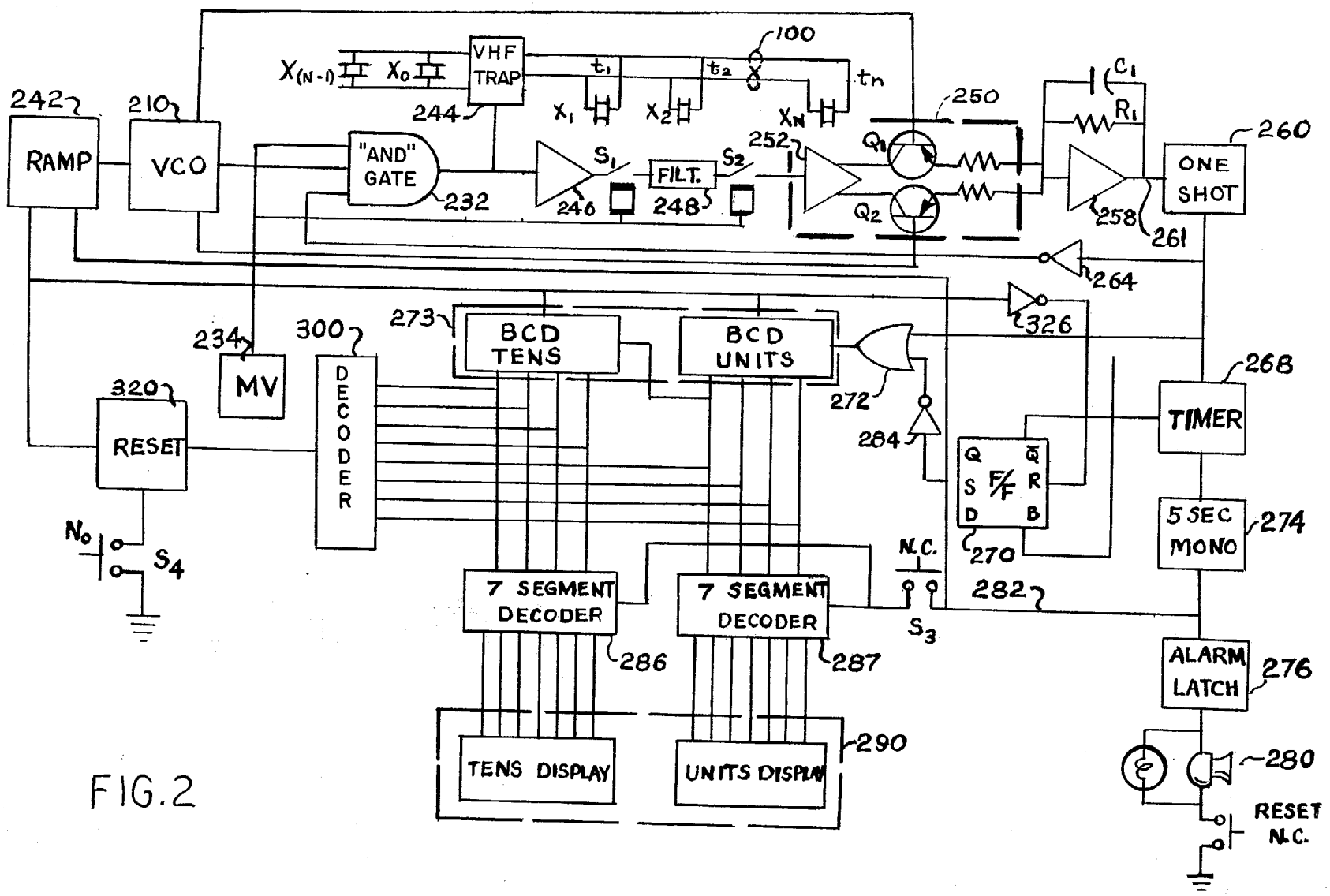

Other objects and features of the invention will be apprehended from the following specification taken in conjunction with the annexed figures of which FIG. 1 is a simplified block diagram of the invention, FIG. 2 is a block diagram of the invention in its preferred embodiment, FIG. 3 is a detail of the end-point decode matrix of FIG. 2, and FIG. 4 is a detail of the transmit-receive gate of FIG. 2.

FIG. 1 is illustrative of the invention in its broadest context. There is a plurality of appliances $A_1, A_2 \ldots A_n$ to be protected. They are all connected to a transmission line 100. Inside each appliance is a resonator $X_1, X_2, \ldots X_n$. Each of these resonators is tuned to respond to a different frequency.

At a central location is a multi-frequency generator 110 which is designed to transmit signals having frequency components to match the frequencies of each of the n resonators (generically designated $X_i$). It may be convenient to include two test resonators $X_0$ and $X_{(n+1)}$ bracketing the frequency band of the resonators.

Transmission of these frequencies causes the resonators $X_i$ to "sing" and this singing may be detected by a receiver 120, especially if there is a transmit-receive isolator 130 to interrupt transmission while the receiver "listens".

The disappearance of the singing of any resonator is evidence of the removal of the appliance. The singing of the resonators might be detected by including in the receiver a detector corresponding to each of the resonators $X_i$; but this is seen to be unnecessary when multiplexing means 140 are provided so that the same receiving circuits may be used sequentially to listen in turn for the singing of the several resonators $X_i$ according to some prearranged program. As singing of the resonators is detected, these events each increment a register 150 according to a prearranged pattern until all of the resonators are accounted for. The failure of the register to conform to the prearranged pattern of counts, triggers as alarm 160.

There are various means well known in the art to produce a plurality of frequencies sequentially or simultaneously whereby to stimulate the resonators; and there are various means by which the receiver may be tuned to respond to one after the next of the resonators. Frequency synthesizers, or example, may be programmed to switch from frequency to frequency in accordance with any predetermined pattern. The use of such sophisticated equipment may be justified in some cases, but a much simpler preferred embodiment has been found to be satisfactory for motel television protection, as shown in FIG. 2.

The multi-frequency generator is a voltage-controlled oscillator (vco) 210 controllable between 200 kiloherz and 400 kiloherz. The resonators $X_0, X_1 \ldots X_n, X_{(n+1)}$ are tuned at frequencies such as 250,000 herz, 252,000, 254,000 etc. up to 352,000 herz if there are 50 appliances to protect (n=50)

The transmit-receive isolator is a gate circuit 232 operated with switches $S_1$ and $S_2$ by a 100 herz multivibrator 234. Multiplexing is achieved by modulating the vco 210 with a ramp generator 242 which linearly sweeps the frequency of the vco 210 across the band including all of the resonators in less than a minute.

Since the Q of quartz crystal resonators at these frequencies is typically 30,000, and Q is a measure of the ratio of the energy of vibration to the amount of that energy dissipated in a cycle of free oscillation, ringing time of such crystals is of the order to a tenth of a second. The energy decays by a constant factor over each interval of time. If we term the "half-life" as the time required for half of the energy of vibration to decay, then, for purposes of this specification "ringing time" is defined as two half lives. The dynamics of quartz crystal oscillators are well described in the literature; and need not be repeated here since details are unimportant to the practice of the invention wide variations in all parameters being permissible. It has been found that so-called DT cut crystals do not exhibit objectionable modes of oscillation and are, therefore preferred.

In the embodiment of FIG. 2, the alarm set is connected to the common antenna transmission line 100 for all of the TV sets of a motel through a VHF trap 244 which prevents the system frquencies and harmonics from interfering with television reception. The crystals $X_1, X_2 \ldots X_n$ are connected between terminal pairs $t_1, t_2 \ldots t_n$ which are the antenna terminals of the television sets installed in the n suites to be protected. There must be an isolating impedance in the branch to each applicance so that a thief could not disable the whole system by shorting out the cable in one room, and isolation (not shown) may also be needed to protect television reception from too close coupling to the system.

The band pass of the receiving circuits is determined by a filter 248 (at the output of the amplifier 246) which need not have sharp skirts but which excludes broadcast radio signals above 400 kiloherz (kh) and power system noises below 200 kh. This filter also determines the response time of the receiving system which can be ready much less than a millisecond. The ringing time of the crystals and the response time bracket the switching period of the transmit-receive isolation circuitry. The multivibrator 234 has a frequency of about 100 herz transmitting for 2 milliseconds, and receiving for 8 milliseconds in each period. The output of the oscillator 210 is passed by the "and" gate 232, while the passage of ringing signals through the receiving circuitry is interrupted by switches $S_1$ and $S_2$ at the input and output respectively of the filter 246.

It is a property of the crystal oscillators at resonance both the magnitude and phase angle of the impedance change markedly with a change of only about 30 herz in frequency. Thus the freely decaying crystal oscillations will tend to either lag or lead the driving oscillator as the oscillations are being built up or diminished. Thus, although the amplitude of the ringing signals responds to the oscillator, a detector based on both phase and amplitude produces a larger, sharper, and more characteristic response.

The phase detector 250 comprises a phase-splitting amplifier 252 to produce opposite phases of the amplified ringing signal which are applied to the collectors of the transistors $Q_1$ and $Q_2$. Opposite reference phases are supplied directly from the oscillator 210 to the bases of the transistors $Q_1$ and $Q_2$. The detected output from the two transistors will undergo a full excursion from minimum to maximum amplitude in the space of two sampling times. The output is smoothed by the low-pass circuit comprising the amplifier 258 with feedback capacitance $C_1$ and resistance $R_1$ which is down 3 db. at 100 herz.

The smoothed output of the low pass circuit is applied to the One-shot trigger circuit 260 by connection 261.

Because of the integration time, the one-shot fires at about the time the gate 232 is to reopen. Via connection 262 and inverter 264 the gate 232 is blocked for an instant. The output pulse of the trigger circuit 260 is also applied to a second trigger circuit, the timer 268, to the bistable circuit 270 and through the "or" gate 272 to increment the two-stage binary-coded-decimal counter 273. The timer 268 occupies its "zero" condition for approximately three-fourths of a second unless within that time it receives the next pulse from the one-shot 260, in which case its zero is extended for a further three-fourths second. Three-quarters of a second is selected as being significantly greater than the time required for the ramp generator 234 to sweep the oscillator 210 by the two kh separation between crystals. Thus, in normal operation the timer 268 is never permitted to set itself to "one." The bistable circuit 270 is provided to hold the timer 268 at zero even at the end of a scanning cycle. It is, therefore, necessary to install at the alarm set, or elsewhere, crystals for any rooms that do not have installed TV sets.

When a TV is removed, there is a gap in the pattern of pulses from the one-shot 260, and the timer 268 switches itself back to "one." This change of state triggers a second one-shot 274, which in turn immediately triggers the latch circuit 276, turning on the alarm 280. Through connection 282, inverter 284, and gate 272, and through normally closed switch $S_3$ the one-shot 274 calls for the decoders 286 and 287 to generate a display of the number of the missing crystal on the display 290, and finally through connection 292 stops the sweep. After a predetermined delay of typically three to ten seconds to allow an attendant to note the number, the one-shot 273 resets, increments the counter 274 to correct the count for the missing crystal, and the sweep resumes.

The sweep continues until the number (n+1) is accumulated on the counter 273 at the time when the sweep reaches the frequency of the crystal $X_{(n+1)}$, the upper end-point crystal. At that point, the end-point decoder 300 (shown in detail in FIG. 3) activates the reset one-shot 320, which produces a reset signal on connection 322. This signal resets the ramp generator 242, the counter 273, and through inverter 326, the bistable 270. Because the ramp generator cannot be relied upon to reset to exactly the same frequency each time, it is reset to some frequency safely below the frequency of the resonator $X_0$ and the timer is held in its zero state until the first pulse from the one-shot 260 is applied to the bi-stable to release the zero state maintained until that time through connection 330 to the bistable 270.

It will be recognized that the invention may be constructed in many equivalent ways using logic components available in commerce and well-known in the art. The following parts are preferred: For the BCD counter 273, two sections of Texas Instruments type 7490 integrated circuits; for the seven segment decoders 286 and 287, type 7447; for the "ready" bistable 270, half of a type 7474. The gate 232 is wired from standard parts as shown in FIG. 4.

The endpoint decoder is preferably made up of one part 331 of a No. 7400 nand gate, one No. 7460 dual four-input and gate 332, and two No. 7400 gates 333 and 334 connected as inverters as shown in FIG. 3.

The outputs of the first section 333 supplies at terminals A and $\overline{A}$ one BCD bit and its complement; similarly the other outputs $B,\overline{B},C,\overline{C}$ & $D,\overline{D}$ are available for units and in the other section 334 $A',\overline{A'},B',\overline{B'},C,\overline{C'}$ & $D,\overline{D'}$ for tens.

Depending upon the selected value of (n+1) either A or $\overline{A}$ is jumpered to terminal 1 of gate 335. Similarly selected jumpers are made to terminals, 2,3, and 4 of gate 335, and to terminals 1',2',3', and 4' of gate 336.

A significantly important use for the invention has been found in the protection of television sets in motels. In this service, a common antenna system is generally available, and this has been found to supply a superior transmission line compared to the electrical power wiring. Commonly there is so much noise of various descriptions on the power lines that the simple system disclosed herein may be unreliable. The circuitry may be made more selective by using the superheterodyne principle in the receiving circuitry, or by a more sophisticated frequency modulator permitting the oscillator to "slew" between crystals so that more time may be devoted to confirming signals.

Transmit-receive isolation may be achieved by other means such as balanced bridge-like circuitry which would approximately balance to exclude transmitter power from the receiver except where the phase departs wildly as it does in the neighborhood of the resonances.

It will thus be seen that the objects set forth above, among those made apparent from the preceding description, are efficiently attained. Since certain changes may be made in the constructions set forth without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A theft detection system for remote detection of the removal from a transmission line of any of a plurality of appliances, each of appliances having a pair of electrical terminals for connection to said transmission line, the combination of, a. a plurality of crystal resonators, each of said resonators being resonant at a frequency which is one of an ordered set of frequencies and different from the resonant frequency of the others of said plurality, each of said resonators being connected between a pair of said terminals to be set to ringing by application of a voltage at said one frequency to said pair, and b. an alarm set remote from said appliances connected to said transmission line, said alarm comprising i. transmitter means including a variable voltage controlled oscillator for generating sequential electrical signals having substantial energy components at each of the resonant frequencies of said plurality of resonators, ii. receiving means connected to said transmission line for detecting signals at each of said resonant frequencies, iii. transmit-receive isolation means for connecting said transmitter means to said transmission line so that the energy components at said resonant frequencies generated by said transmitter means flow into said transmission line and are substantially prevented from flowing directly into said receiving means, iv. multiplexing means for rendering said receiving means sensitive to said resonant frequencies according to a predetermined program of intervals and order, v. alarm means connected to said receiver means responsive to a departure from said program, and vi. counting means connected to said multiplexing means for counting signals corresponding to each detected resonant frequency.

2. A theft detection system for remote detection of the removal from a transmission line of any of a plurality of appliances, each of said appliances having a pair of electrical terminals for connection to said transmission line, the combination of, a. a plurality of resonators, each of said resonators being resonant at a frequency which is one of an ordered set of frequencies and different from the resonant frequency of the others of said plurality, each of said resonators being connected between a pair of said terminals to be set to ringing by application of a voltage at said one frequency to said pair, and b. an alarm set remote from said appliances connected to said transmission line, said alarm comprising i. transmitter means for generating an electrical signal having substantial energy components at each of the resonant frequencies of said plurality of resonators, ii. receiving means connected to said transmission line for detecting signals at each of said resonant frequencies, iii. transmit-receive isolation means for connecting said transmitter means to said transmission line so that the energy components at said resonant frequencies generated by said transmitter means flow into said transmission line and are substantially prevented from flowing directly into said receiving means, iv. multiplexing means for rendering said receiving means responsive to said resonant frequencies according to a predetermined program of intervals and order, and v. alarm means connected to said receiver means responsive to a departure from said program, c. said transmitter means comprising an oscillator adapted for frequency modulation over a band of frequencies, d. said receiving means comprising filter means selective of said band, a detector, and a low-pass circuit, e. said resonant frequencies being uniformly spaced within said band, f. said multiplexing means comprising a linear modulator for advancing the frequency of said oscillator regularly from one end of said band to the other slowly enough to excite in each of said resonators an unambiguous response, g. said oscillator being a voltage-controlled oscillator having a center frequency of the order of 300 kiloherz, h. said resonators being quartz crystals having resonant frequencies spaced by uniform intervals of substantially two kiloherz, i. said filter having a pass band from 200 kiloherz to 400, j. said detector being a phase detector responsive to changes in amplitude and phase as said oscillator is swept past one of said resonant frequencies, and a low pass circuit, k. said transmit-receive isolations means comprising a switch and a multivibrator means for driving said switch alternately between a first state and a second state, said switch being arranged so that in its said first state, energy passes freely between said oscillator and said transmission line and transmission of signals through said filter is blocked, and in its said second state signals pass freely from said transmission line through said filter and flow of energy from said oscillator to said transmission line is blocked, l. said modulator comprising a ramp generator to supply a modulating voltage to sweep said oscillator at a rate of the order of four kiloherz per second, and m. said alarm means comprising i. a first trigger circuit for producing a counter-activating pulse at each time of crossing of said oscillator frequency and the resonant frequency of one of said resonators, ii. a counter for accumulating the number of such crossings, iii. a timer to mark the interval between said pulses, responsive to a delay significantly in excess of the programmed interval between said pulses to sound an alarm, stop the sweep of the ramp, and read out the accumulated number in said counter, and iv. means for resetting said ramp generator upon said counter accumulating the cardinal number of resonators connected to said transmission said number being the sum of the number of said plurality and of control resonators part of said alarm set.

3. A theft detection system for remote detection of the removal from a transmission line of any of a plurality of appliances, each of said appliances having a pair of electrical terminals for connection to said transmission line, the combination of, a. a plurality of resonators, each of said resonators being resonant at a frequency which is one of an ordered set of frequencies and different from the resonant frequency of the others of said plurality, each of said resonators being connected between a pair of said terminals to be set to ringing by application of a voltage at said one frequency to said pair, and b. an alarm set remote from said appliances connected to said transmission line, said alarm comprising i. transmitter means for generating an electrical signal having substantial energy components at each of the resonant frequencies of said plurality of resonators, ii. receiving means connected to said transmission line for detecting signals at each of said resonant frequencies, iii. transmit-receive isolation means for connecting said transmitter means to said transmission line so that the energy components at said resonant frequencies generated by said transmitter means flow into said transmission line and are substantially prevented from flowing directly into said receiving means.

iv. multiplexing means for rendering said receiving means sensitive to said resonant frequencies according to a predetermined program of intervals and order, and v. alarm means connected to said receiver means responsive to a departure from said program, c. said transmission means being a voltage controlled oscillator variable in frequency over a band about a center frequency of the order of 300 kiloherz, d. said resonators being quartz crystals having resonant frequencies spaced by uniform intervals within said band, e. said receiving means comprising an amplifier, a filter, for selectively passing said resonant frequencies and a phase detector responsive to changes in amplitude and phase as said oscillator is swept past one of said resonant frequencies, and a low pass circuit, f. said transmit-receive isolation means comprising a switch and multivibrator means for driving said switch alternately between a first state and a second state, said switch being arranged so that in its said first state energy passes freely between said oscillator and said transmission line and transmission of signals through said filter is blocked, and in its said second state signals pass freely from said transmission line through said filter and flow of energy from said oscillator to said transmission line is blocked, g. said multiplexing means comprising a ramp generator to supply a modulating voltage to sweep said oscillator at a rate of the order of four kiloherz per second, and h. said alarm means comprising, i. a first trigger circuit for producing a counter activating pulse each time of crossing of said oscillator frequency and the resonant frequency of any of said resonators, ii. a counter for accumulating the number of such crossings, iii. a timer to mark the interval between said pulses, responsive to an interval significantly in excess of the programmed interval between said pulses to sound an alarm, stop the sweep of said ramp generator, and read out the accumulated number in said counter, and iv. means for resetting said ramp generator upon said counter accumulating the cardinal number of resonators connected to said transmission line, said number being the sum of the number of said plurality and the number of control resonators part of said alarm set.

4. A theft detection system for remote detection of the removal from a transmission line of any of a plurality of appliances, each of said appliances having a pair of electrical terminals for connection to said transmission line, the combination of, a. a plurality of resonators, each of said resonators being resonant at a frequency which is one of an ordered set of frequencies and different from the resonant frequency of the others of said plurality, each of said resonators being connected between a pair of said terminals to be set to ringing by application of a voltage at said one frequency to said pair, and b. an alarm set remote from said appliances connected to said transmission line, said alarm comprising i. transmitter means for generating an electrical signal having substantial energy components at each of the resonant frequencies of said plurality of resonators, ii. receiving means connected to said transmission line for detecting signals at each of said resonant frequencies, iii. transmit-receive isolation means for connecting said transmitter means to said transmission line so that the energy components at said resonant frequencies generated by said transmitter means flow into said transmission line and are substantially prevented from flowing directly into said receiving means, iv. multiplexing means for rendering said receiving means sensitive to said resonant frequencies according to a predetermined program of intervals and order, and v. alarm means connected to said receiver means responsive to a departure from said program, c. said transmitted means being an oscillator variable in frequency over a band about a center frequency, d. said resonators having resonant frequencies spaced by uniform intervals within said band, e. said multiplexing means sweep the frequency of said oscillator at uniform rate across said band, and f. said alarm means comprising, i. a first trigger circuit for producing a counter incrementing pulse each time of crossing of said oscillator frequency and the resonant frequency of any of said resonators, ii. a counter for accumulating the number of such crossings, and iii. a timer to mark the interval between said pulses, responsive to an interval significantly in excess of the programmed interval between said pulses to sound an alarm, stop the sweep, and read out the accumulated number.

5. A system as defined by claim 4 wherein c. said transmitter means comprises an oscillator adapted for frequency modulation over a band of frequencies, d. said receiving means comprise filter means selective of said band, a detector, and a low-pass circuit, e. said resonant frequencies are uniformly spaced within said band, and f. said multiplexing means comprise a linear modulator for advancing the frequency of said oscillator regularly from one end of said band to the other slowly enough to excite in each of said resonators an unambiguous response.

6. A system as defined by claim 5, g. wherein said resonators are quartz crystals.

7. A system as defined by claim 5, g. wherein said transmit-receive isolation means comprise i. a switch having a first and a second state, connected to said transmitter means, said receiving means, and said transmission line, arranged so that in its first state energy passes freely between said transmitter means and said transmission line and is substantially barred from passing from said transmission line and from said transmitter means through said receiver means, and in its second state signals pass freely between said receiver means and said transmission line, ii. together with driving means for periodically oscillating said switch between its said two states at intervals which are substantially briefer than the ringing time of said resonators, and substantially longer than the response time of said filter means.

8. A system as defined by claim 6, h. wherein said transmit-receive isolation means comprise, i. a switch having a first and a second state, connected to said transmitter means, said receiving means, and said transmission line, arranged so that in its first state energy passes freely between said transmitter means and said transmission line and is substantially barred from passing from said transmission line and from said transmitter means through said receiver means, and in its second state signals pass freely between said receiver means and said transmission line, ii. together with driving means for periodically oscillating said switch between its said two states at intervals which are substantially briefer than the ringing time of said resonators, and substantially longer than the response time of said filter means.

9. A system as defined by claim 8 wherein, i. said ringing time is of the order of one-tenth second, j. said response time is of the order of one-tenth of a millisecond, k. said switching intervals are of the order of 10 milliseconds, and wherein l. said oscillator frequency is advanced from one of said resonant frequencies to the next in the order of one second, m. whereby a complete scanning cycle is completed in the order of one minute.

10. A system as defined by claim 8 wherein, i. said ringing time is more than 10 milliseconds, j. said response time is less than one-tenth of a millisecond, k. said switching intervals are between two and 50 milliseconds, and wherein l. said oscillator frequency is advanced from one of said resonant frequencies to the next in less than one second.

11. A system as defined by claim 8 wherein said oscillator is a voltage-controlled oscillator.

*12. A detection system for remote detection of the presence in or absence from a transmission line of any of a plurality of resonators, each of said resonators being connectable with and disconnectable from said transmission line, the combination of,*

*a. a plurality of crystal resonators, each of said resonators being resonant at a frequency which is one of an ordered set of frequencies and different from the resonant frequency of the others of said plurality, each of said resonators when connected with said transmission line being set to ringing by application of a voltage at said one frequency to said transmission line, and*

*b. an alarm set remote from said resonators connected to said transmission line, said alarm comprising,*

*i. transmitter means including a variable voltage controlled oscillator for generating sequential electrical signals having substantial energy components at each of the resonant frequencies of said plurality of resonators,*

*ii. receiving means connected to said transmission line for detecting signals at each of said resonant frequencies,*

*iii. transmit-receive isolation means for connecting said transmitter means to said transmission line so that the energy components at said resonant frequencies generated by said transmitter means flow into said transmission line and are substantially prevented from flowing directly into said receiving means,*

*iv. multiplexing means for rendering said receiving means sensitive to said resonant frequencies according to a predetermined program of intervals and order,*

*v. alarm means connected to said receiver means responsive to a departure from said program, and*

*vi. counting means connected to said multiplexing means for counting signals corresponding to each detected resonant frequency.*

*13. A detection system for remote detection of the presence in or absence from a transmission line of any of a plurality of resonators, each of said resonators being connectable with and disconnectable from said transmission line, the combination of,*

*a. a plurality of crystal resonators, each of said resonators being resonant at a frequency which is one of an ordered set of frequencies and different from the resonant frequency of the others of said plurality, each of said resonators when connected with said transmission line being set to ringing by application*

*of a voltage at said one frequency to said transmission line, and*

*b. an alarm set remote from said resonators connected to said transmission line, said alarm comprising,*

*i. transmitter means for generating an electrical signal having substantial energy components at each of the resonant frequencies of said plurality of resonators,*

*ii. receiving means connected to said transmission line for detecting signals at each of said resonant frequencies,*

*iii. transmit-receive isolation means for connecting said transmitter means to said transmission line so that the energy components at said resonant frequencies generated by said transmitter means flow into said transmission line and are substantially prevented from flowing directly into said receiving means,*

*iv. multiplexing means for rendering said receiving means sensitive to said resonant frequencies according to a predetermined program of intervals and order, and*

*v. alarm means connected to said receiver means responsive to a departure from said program,*

*c. said transmitter means comprising an oscillator adapted for frequency modulation over a band of frequencies,*

*d. said receiving means comprising filter means selective of said band, a detector, and a low-pass circuit,*

*e. said resonant frequencies being uniformly spaced within said band,*

*f. said multiplexing means comprising a linear modulator for advancing the frequency of said oscillator regularly from one end of said band to the other slowly enough to excite in each of said resonators an unambiguous response,*

*g. said oscillator being a voltage-controlled oscillator having a center frequency of the order of 300 kiloherz,*

*h. said resonators being quartz crystals having resonant frequencies spaced by uniform intervals of substantially two kiloherz,*

*i. said filter having a pass band from 200 kiloherz to 400,*

*j. said detector being a phase detector responsive to changes in amplitude and phase as said oscillator is swept past one of said resonant frequencies, and a low pass circuit,*

*k. said transmit-receive isolations means comprising a switch and a multivibrator means for driving said switch alternately between a first state and a second state, said switch being arranged so that in its said first state, energy passes freely between said oscillator and said transmission line and transmission of signals through said filter is blocked, and in its said second state signals pass freely from said transmission line through said filter and flow of energy from said oscillator to said transmission line is blocked,*

*l. said modulator comprising a ramp generator to supply a modulating voltage to sweep said oscillator at a rate of the order of four kiloherz per second, and*

*m. said alarm means comprising,*

*i. a first trigger circuit for producing a counteractivating pulse at each time of crossing of said oscillator frequency and the resonant frequency of one of said resonators,*

*ii. a counter for accumulating the number of such crossings,*

*iii. a timer to mark the interval between said pulses, responsive to a delay significantly in excess of the programmed interval between said pulses to sound an alarm, stop the sweep of the ramp, and read out the accumulated number in said counter, and*

*iv. means for resetting said ramp generator upon said counter accumulating the cardinal number of resonators connected to said transmission said number being the sum of the number of said plurality and of control resonators part of said alarm set.*

*14. A detection system for remote detection of the presence in or absence from a transmission line of any of a plurality of resonators, each of said resonators being connectable with and disconnectable from said transmission line, the combination of,*

*a. a plurality of crystal resonators, each of said resonators being resonant at a frequency which is one of an ordered set of frequencies and different from the resonant frequency of the others of said plurality, each of said resonators when connected with said transmission line being set to ringing by application of a voltage at said one frequency to said transmission line, and*

*b. an alarm set remote from said resonators connected to said transmission line, said alarm comprising,*

*i. transmitter means for generating an electrical signal having substantial energy components at each of the resonant frequencies of said plurality of resonators,*

*ii. receiving means connected to said transmission line for detecting signals at each of said resonant frequencies,*

*iii. transmit-receive isolation means for connecting said transmitter means to said transmission line so that the energy components at said resonant frequencies generated by said transmitter means flow into said transmission line and are substantially prevented from flowing directly into said receiving means,*

*iv. multiplexing means for rendering said receiving means sensitive to said resonant frequencies according to a predetermined program of intervals and order, and*

*v. alarm means connected to said receiver means responsive to a departure from said program,*

*c. said transmission means being a voltage controlled oscillator variable in frequency over a band about a center frequency of the order of 300 kiloherz,*

*d. said resonators being quartz crystals having resonant frequencies spaced by uniform intervals within said band,*

*e. said receiving means comprising an amplifier, a filter, for selectively passing said resonant frequencies and a phase detector responsive to changes in amplitude and phase as said oscillator is swept past one of said resonant frequencies, and a low pass circuit,*

*f. said transmit-receive isolation means comprising a switch and multivibrator means for driving said switch alternately between a first state and a second state, said switch being arranged so that in its said first state energy passes freely between said oscillator and said transmission line and transmission of signals through said filter is blocked, and in its said second state signals pass freely from said transmission line through said filter and flow of energy from said oscillator to said transmission line is blocked,*

*g. said multiplexing means comprising a ramp generator to supply a modulating voltage to sweep said oscillator at a rate of the order of four kiloherz per second, and*

*h. said alarm means comprising,*

*i. a first trigger circuit for producing a counter activating pulse each time of crossing of said oscillator frequency and the resonant frequency of any of said resonators,*

*ii. a counter for accumulating the number of such crossings,*

*iii. a timer to mark the interval between said pulses, responsive to an interval significantly in excess of the programmed interval between said pulses to sound an alarm, stop the sweep of said ramp generator, and read out the accumulated number in said counter, and*

*iv. means for resetting said ramp generator upon said counter accumulating the cardinal number of resonators connected to said transmission line, said number being the sum of the number of said plurality and the number of control resonators part of said alarm set.*

*15. A detection system for remote detection of the presence in or absence from a transmission line of any of a plurality of resonators, each of said resonators being connectable with and disconnectable from said transmission line, the combination of,*

*a. a plurality of crystal resonators, each of said resonators being resonant at a frequency which is one of an ordered set of frequencies and different from the resonant frequency of the others of said plurality, each of said resonators when connected with said transmission line being set to ringing by application of a voltage at said one frequency to said transmission line, and*

*b. an alarm set remote from said resonators connected to said transmission line, said alarm comprising,*

*i. transmitter means for generating an electrical signal having substantial energy components at each of the resonant frequencies of said plurality of resonators,*

*ii. receiving means connected to said transmission line for detecting signals at each of said resonant frequencies,*

*iii. transmit-receive isolation means for connecting said transmitter means to said transmission line so that the energy components at said resonant frequencies generated by said transmitter means flow into said transmission line and are substantially prevented from flowing directly into said receiving means,*

*iv. multiplexing means for rendering said receiving means sensitive to said resonant frequencies according to a predetermined program of intervals and order, and*

*v. alarm means connected to said receiver means responsive to a departure from said program,*

*c. said transmitted means being an oscillator variable in frequency over a band about a center frequency,*

*d. said resonators having resonant frequencies spaced by uniform intervals within said band,*

*e. said multiplexing means sweep the frequency of said oscillator at uniform rate across said band, and*

*f. said alarm means comprising,*

*i. a first trigger circuit for producing a counter incrementing pulse each time of crossing of said oscillator frequency and the resonant frequency of any of said resonators,*

*ii. a counter for accumulating the number of such crossings, and*

*iii. a timer to mark the interval between said pulses, responsive to an interval significantly in excess of the programmed interval between said pulses to sound an alarm, stop the sweep, and read out the accumulated number.*

*16. A system as defined by claim 15, wherein,*

*c. said transmitter means comprises an oscillator adapted for frequency modulation over a band of frequencies,*

*d. said receiving means comprise filter means selective of said band, a detector, and a low-pass circuit,*

*e. said resonant frequencies are uniformly spaced within said band, and*

*f. said multiplexing means comprise a linear modulator for advancing the frequency of said oscillator regularly from one end of said band to the other slowly enough to excite in each of said resonators an unambiguous response.*

*17. A system as defined by claim 16,*

*g. wherein said resonators are quartz crystals.*

*18. A system as defined by claim 16,*

*g. wherein said transmit-receive isolation means comprise,*

*i. a switch having a first and a second state, connected to said transmitter means, said receiving means, and said transmission line, arranged so that in its first state energy passes freely between said transmitter means and said transmission line and is substantially barred from passing from said transmission line and from said transmitter means through said receiver means, and in its second state signals pass freely between said receiver means and said transmission line,*

*ii. together with driving means for periodically oscillating said switch between its said two states at intervals which are substantially briefer than the ringing time of said resonators, and substantially longer than the response time of said filter means.*

*19. A system as defined by claim 17,*

*h. wherein said transmit-receive isolation means comprise,*

*i. a switch having a first and a second state, connected to said transmitter means, said receiving means, and said transmission line, arranged so that in its first state energy passes freely between said transmitter means and said transmission line and is substantially barred from passing from said transmission line and from said transmitter means through said receiver means, and in its second state signals pass freely between said receiver means and said transmission line,*

*ii. together with driving means for periodically oscillating said switch between its said two states at intervals which are substantially briefer than the ringing time of said resonators, and substantially longer than the response time of said filter means.*

*20. A system as defined by claim 19, wherein,*

*i. said ringing time is of the order of one-tenth second,*

*j. said response time is of the order of one-tenth of a millisecond,*

*k. said switching intervals are of the order of 10 milliseconds, and wherein*

*l. said oscillator frequency is advanced from one of said resonant frequencies to the next in the order of one second,*

*m. whereby a complete scanning cycle is completed in the order of one minute.*

*21. A system as defined by claim 19, wherein,*

*i. said ringing time is more than 10 milliseconds,*

*j. said response time is less than one-tenth of a millisecond,*

*k. said switching intervals are between two and 50 milliseconds, and wherein*

*l. said oscillator frequency is advanced from one of said resonant frequencies to the next in less than one second.*

*22. A system as defined by claim 19, wherein said oscillator is a voltage-controlled oscillator.*

*23. A detection system for remote detection of the presence in or absence from a transmission line of any of a plurality of resonators, each of said resonators being connectable with and disconnectable from said transmission line, the combination of,*

*a. a plurality of crystal resonators, each of said resonators being resonant at a frequency which is one of an ordered set of frequencies and different from the resonant frequency of the others of said plurality, each of said resonators when connected with said transmission line being set to ringing by application of a voltage at said one frequency to said transmission line, and*

*b. an alarm set remote from said resonators connected to said transmission line, said alarm comprising,*

*i. transmitter means including a variable controlled oscillator for generating sequential electrical signals having substantial energy components at each of the resonant frequencies of said plurality of resonators,*

*ii. receiving means connected to said transmission line for detecting signals at each of said resonant frequencies,*

*iii. transmit-receive isolation means for connecting said transmitter means to said transmission line so that the energy components at said resonant frequencies generated by said transmitter means flow into said transmission line and are substantially prevented from flowing directly into said receiving means,*

*iv. multiplexing means for rendering said receiving means sensitive to said resonant frequencies according to a predetermined program of intervals and order,*

*v. alarm means connected to said receiver means responsive to a departure from said program, and*

*vi. counting means connected to said multiplexing means for counting signals corresponding to each detected resonant frequency.*

*24. The invention defined in claim 23, wherein said variable controlled oscillator comprises frequency synthesizer means programmed to switch from frequency to frequency of said crystal resonators in accordance with a predetermined pattern.*

* * * * *